United States Patent [19]

Meloche et al.

[11] 4,235,076
[45] Nov. 25, 1980

[54] VEHICLE ENGINE HAVING TURBOCHARGER BYPASS WITH BOOST CONTROL AND CONVERTER WARM-UP FUNCTIONS

[75] Inventors: Kenneth R. Meloche, St. Clair Shores; Coburn C. Bland, Jr., Haslett, both of Mich.; Ronald R. Terry, Mineral Ridge, Ohio

[73] Assignee: General Motors Corporation, Detroit, Mich.

[21] Appl. No.: 35,524

[22] Filed: May 3, 1979

[51] Int. Cl.³ .................... F01N 5/04; F02B 37/00
[52] U.S. Cl. ................................ 60/602; 60/280; 60/284
[58] Field of Search .............. 60/600, 601, 602, 603, 60/280, 284, 288

[56] References Cited
U.S. PATENT DOCUMENTS

| | | | |
|---|---|---|---|
| 3,173,242 | 3/1965 | Erickson | 60/601 |
| 4,075,849 | 2/1978 | Richardson | 60/602 |

FOREIGN PATENT DOCUMENTS

| | | | |
|---|---|---|---|
| 2326989 | 12/1974 | Fed. Rep. of Germany | 60/280 |
| 2650033 | 5/1978 | Fed. Rep. of Germany | 60/602 |

OTHER PUBLICATIONS

SAE Paper No. 780718, "Turbocharging Engines for Racing and Passenger Cars", Mezger, 7 Aug. 1978.

*Primary Examiner*—Michael Koczo
*Attorney, Agent, or Firm*—Robert J. Outland

[57] ABSTRACT

An automotive vehicle having a turbocharged internal combustion engine and a heat initiated exhaust treatment device, such as a catalytic converter, in the exhaust system is provided with a multiple function turbine bypass valve with controls that provide bypass of the exhaust gases directly to the treatment device during warm-up and also provide a boost controlling wastegate function that limits the turbocharger boost pressure during normal operation. Full throttle bypass override to provide turbocharger boost during warm-up as well as other control and operating functions are also disclosed.

4 Claims, 2 Drawing Figures

VEHICLE ENGINE HAVING TURBOCHARGER BYPASS WITH BOOST CONTROL AND CONVERTER WARM-UP FUNCTIONS

TECHNICAL FIELD

This invention relates to turbocharged engine driven automotive vehicles wherein the engine exhaust system includes a heat initiated exhaust treatment device located after the turbocharger turbine. In its more specific aspects the invention relates to multiple function bypass valve means for providing warm-up of the treatment device and boost control for the turbocharger of a vehicle engine.

BACKGROUND OF THE INVENTION

It is well-known in the art to provide an automotive vehicle with an internal combustion engine having a turbocharger including an exhaust driven turbine driving a compressor in the intake system to compress the charge and thereby increase the power obtainable from an engine of a particular displacement. Recently with the advent of emission controlling catalytic converters and other heat initiated exhaust treatment devices in the exhaust systems of spark ignition engine powered automobiles and certain other automotive vehicles, the application of turbocharged engines to such vehicles has resulted in the known combination of a turbocharged engine powered vehicle having a catalytic converter heat initiated exhaust treatment device in the exhaust system. The turbocharger turbine is conventionally provided with a wastegate valve actuated by suitable controls to limit the turbocharger boost pressure in the engine intake manifold to a predetermined maximum.

It has now been proposed that the converter equipped turbocharged engine exhaust system be provided with an additional bypass valve suitably positioned and controlled to bypass the engine exhaust gases around the turbine directly to the catalytic converter, or other heat initiated exhaust treatment device in the exhaust system, from the time of engine starting until the converter reaches a predetermined temperature at which it becomes operative. In this way, it is anticipated that the desired control of exhaust emissions by the converter will be established sooner and the overall exhaust emission levels may be more closely controlled. A disclosure of this concept and its application may be found in the copending United States patent application Ser. No. 25,337 filed Mar. 30, 1979 in the names of Jeff K. Lane, Joseph M. Negri and Donald J. Harrod and assigned to the assignee of the present invention.

SUMMARY OF THE INVENTION

The present invention provides a dual function bypass valve and control arrangement applied in a turbocharged automotive vehicle engine having a heat initiated exhaust treatment device in which the single bypass valve is operative to accomplish both treatment device warm-up and turbocharger boost control functions. The system includes a bypass valve positioned so as to be capable of bypassing exhaust gases directly to the treatment device around the turbocharger turbine and connecting piping. In a preferred embodiment, the valve is biased closed, but is provided with control and actuating means for opening the valve wide for maximum bypass during warm-up of the treatment device and for opening the valve a controlled more limited amount when necessary to provide boost control during normal engine operation after warm-up. Other features and advantages of the system are also provided as will be more fully understood from the following description of a preferred embodiment taken together with the accompanying drawings.

BEST MODE FOR CARRYING OUT THE INVENTION

Figure 1:
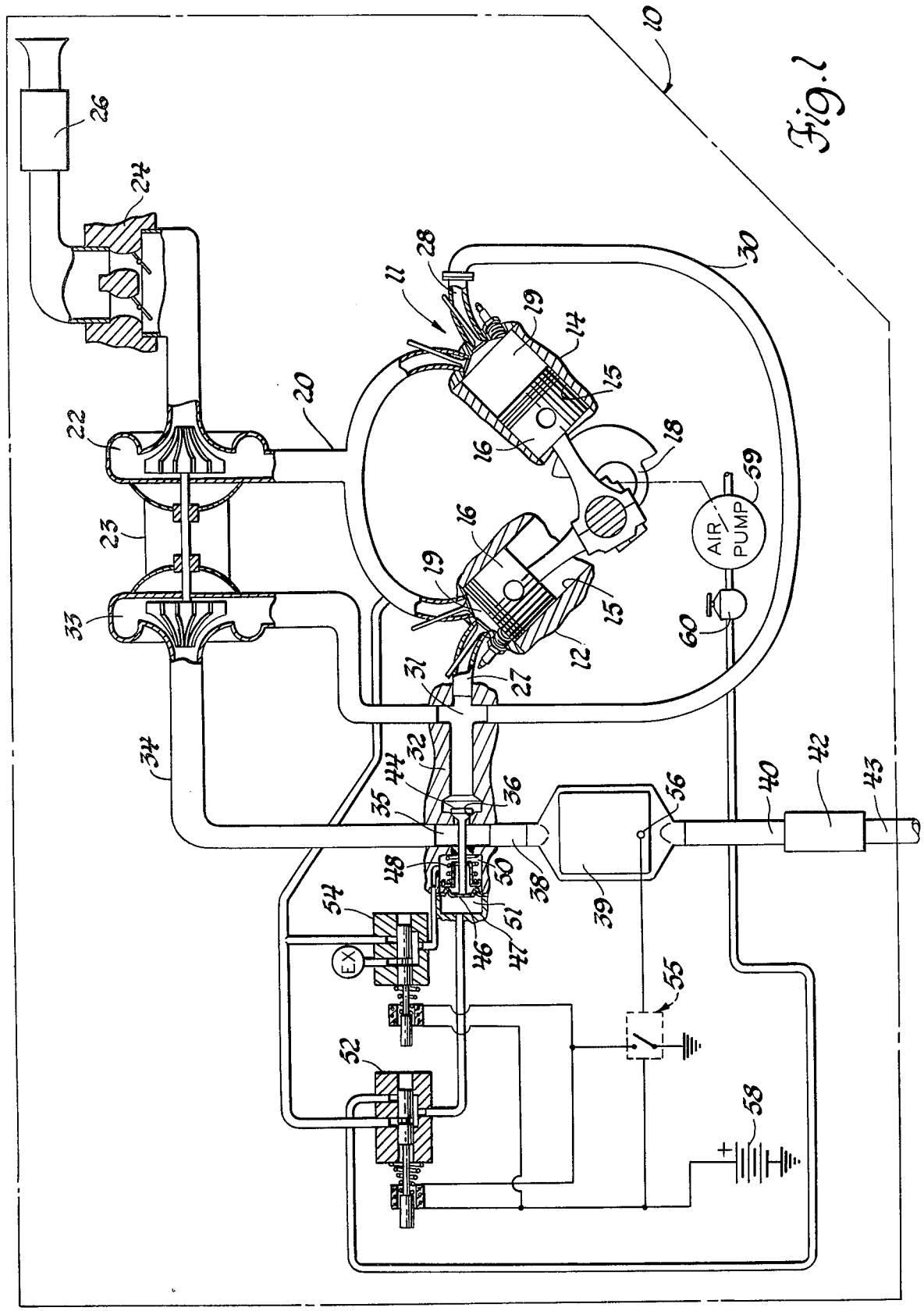
FIG. 1 is a semi-schematic diagram illustrating a turbocharged spark ignition engine in an automotive vehicle having a dual function turbine bypass valve with actuating and control means in accordance with the invention.

Referring first to FIG. 1 of the drawings, numeral 10 generally indicates an automotive vehicle, such as a passenger car, in which there is installed a spark ignited internal combustion engine 11. The engine 11 includes a pair of cylinder banks 12, 14 conventionally arranged in V fashion and each including a plurality of cylinders 15 containing reciprocable pistons 16 connected with an output crank 18 and defining with the cylinders variable volume combustion chambers 19.

The engine has in addition an intake system including an intake manifold 20 that connects the individual combustion chambers 19 with the outlet of a compressor 22 of a conventional engine turbocharger 23. The turbocharger compressor is in turn connected with a carburetor 24 that is adapted to receive air from an air cleaner 26 and fuel from a suitable fuel supply system, not shown, and mix these fluids in conventional fashion to form a combustible air-fuel mixture that is supplied through the turbocharger compressor to the engine combustion chambers 19.

Engine 11 also is provided with an exhaust system including separate exhaust manifolds 27, 28, one for each bank of cylinders. A crossover pipe 30 interconnects the two manifolds conducting the exhaust gases from all the cylinders to an inlet chamber 31 in the housing 32 of a bypass valve assembly. From chamber 31 the gases are conventionally ducted to the inlet of the turbine 33 of the turbocharger 23 from which they pass through an outlet duct 34 to an outlet chamber 35 of the bypass valve housing that is also connected through a bypass opening 36 with the inlet chamber 31.

The outlet chamber of the bypass valve housing 32 is connected by an outlet pipe 38 with an exhaust treatment device which, in this case, takes the form of a catalytic converter 39. The outlet of the converter is in turn connected with a conventional exhaust system including an exhaust pipe 40, muffler 42 and tailpipe 43 which carry the treated exhaust gases to atmosphere.

Within the bypass valve housing 32 there is reciprocably mounted a poppet valve member 44 that is movable from a closed position shown in the drawing, in which the valve closes the opening 36 blocking the flow of exhaust gas therethrough, to various partially and fully opened positions wherein the valve is displaced into the inlet chamber 31 thereby unblocking the bypass opening 36. This permits exhaust gas flow through opening 36 directly to the catalytic converter, bypassing the turbocharger turbine.

The bypass valve member 44 is connected with the diaphragm 46 of a diaphragm actuator 47, the assembly being biased by a spring 48 in direction to urge the valve member 44 toward its closed position. The actuator 47 defines first and second actuator chambers 50, 51, the first chamber 50 being located on the spring side of the diaphragm and the second chamber 51 on the side opposite the spring.

To control the actuator 47, there is provided a control system including a pair of magnet valves 52, 54, a temperature responsive switch 55 with sensor 56 and electric power source 58 and a source of regulated air pressure including an air pump 59 driven by the engine crank 18 and a pressure regulator 60.

Magnet valve 52 is arranged so that when deenergized, as shown in the drawing, it connects the second actuator chamber 51 of the diaphragm actuator with the engine intake manifold 20, thus supplying induction system pressure, from between the turbocharger compressor and the combustion chambers, to the actuator chamber 51. When energized, the magnet valve 52 connects chamber 51 with the pressure regulator 60 which is in turn fed by the air pump 59, thus supplying to chamber 51 a regulated air pressure.

Magnet valve 54 is arranged so that when deenergized, as shown in the drawing, it connects the first actuator chamber 50 with atmosphere. When energized, valve 54 connects the chamber 50 with the engine intake manifold, thus applying induction system pressure, as fed into the combustion chambers, to the chamber 50.

The magnet valves 52, 54 are electrically connected with the temperature switch 55 and therethrough with the power source 58 which may be a battery or other source of electric voltage. The temperature switch is actuated in response to the reaching of a predetermined temperature in the catalytic converter as sensed by the sensor 56 disposed on or within the converter body.

The presently preferred settings of the various components as disclosed in FIG. 1 are as follows:

The spring 48 of the diaphragm actuator 47 is preloaded with a force that requires a pressure differential of approximately 10 psi across diaphragm 46 to overcome and begin to open the valve 44. The pressure regulator 60 is preset to control the pressure supplied by the air pump at a constant value of somewhat below 10 psi and preferably about 7 to 9 psi. The temperature responsive switch 55 is arranged to be closed whenever the temperature sensed by sensor 56 is below a predetermined temperature at which the catalytic converter will operate normally. Above the predetermined temperature, the switch 55 will open.

Under these conditions, the operation of the system as described in FIG. 1 is as follows:

When the engine is started with the system in its cold condition, electrical energy is supplied through the closed switch 55 to the magnet valves 52, 54, energizing these valves. Chamber 51 of the diaphragm actuator is thus connected by valve 52 with the air pressure regulator 60 which supplies it with a constant air pressure of about 9 psi. In like manner, chamber 50 of the actuator is connected through valve 54 with the engine intake manifold.

In this condition, when the engine is operating under normal cruising power conditions or lower, the the partly closed throttles of the carburetor maintain a vacuum in the intake manifold which is transmitted to actuator chamber 50. This vacuum, combined with the gauge pressure of about 9 psi in chamber 51, creates a differential pressure across the diaphragm 46 which is in excess of the 10 psi required to open the valve 44. Thus, the bypass valve is open under the majority of operating conditions of the engine in the cold condition and the major portion of the exhaust gases pass through the bypass valve directly to the catalytic converter 39 so as to provide for its rapid warm-up.

Should the need arise during the warm-up period for operation of the engine under its full throttle condition, the operator's opening of the throttles will substantially reduce the vacuum in the engine intake manifold and thus in chamber 50 of the actuator, thereby reducing the differential pressure across the diaphragm 46. In this case, valve 44 will move toward its closed position, partially or completely blocking the bypass of exhaust gases to the converter and directing the exhaust gas flow primarily, or completely, through the turbocharger turbine so as to provide power for compressing the inlet charge through the normal operation of the turbocharger. In this way, the engine may be operated at or near its normal full output condition when desired, even though the catalytic converter unit has not yet reached its desired operating temperature.

When the predetermined operating temperature of the catalytic converter is reached, this is sensed by sensor 56 which causes the switch 55 to open, deenergizing the magnet valves 52, 54. At this time, chamber 50 of the actuator is connected directly to atmosphere by magnet valve 54, while chamber 51 is connected with the engine intake manifold to receive the pressure or vacuum therein.

Under these conditions, bypass valve 44 will act as a boost control, opening as necessary to limit the pressure in the engine intake manifold to a maximum of about 10 psi, this pressure in chamber 51 being sufficient to offset the force of the biasing spring 48. Thus, at intake manifold pressures below 10 psi, all the engine exhaust gases will be passed through the turbine 33 to provide power for driving the turbocharger compressor 22. However, when the 10 psi limit is reached, the valve 44 will bypass a sufficient portion of the exhaust gases to prevent the turbocharger from increasing the intake manifold pressure significantly beyond the 10 psi limit.

Thus, it may be seen that the bypass valve and control arrangement described provides the dual functions in a single valve of bypassing exhaust gases for fast converter warm-up during normal operation, with an override permitting useful turbocharger power to be developed under full throttle conditions, and additionally waste-gating the turbocharger turbine to provide a pedetermined level of boost pressure control.

Figure 2:
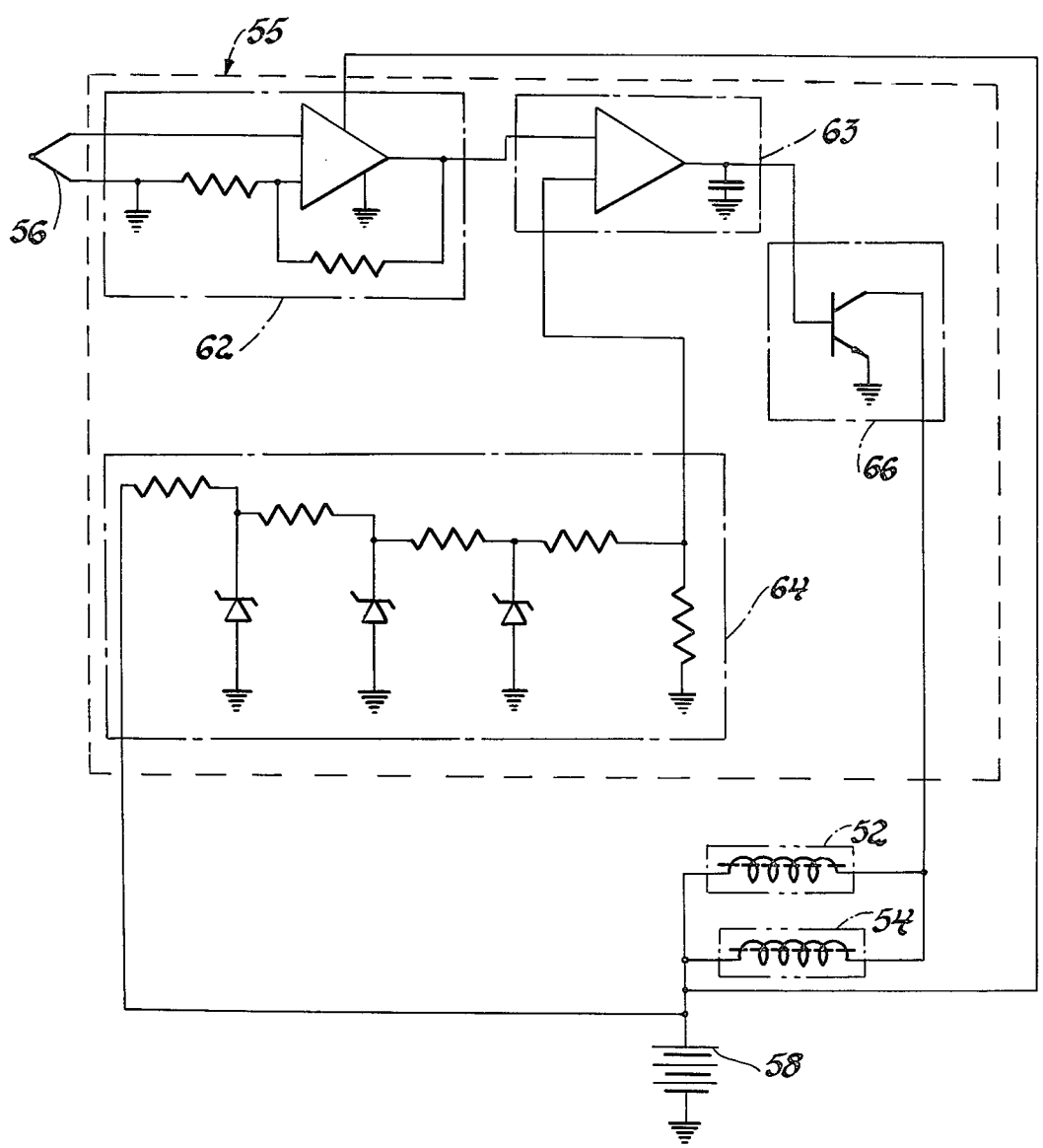
FIG. 2 is a schematic circuit diagram of a temperature responsive electronic switching device used in the control system of the arrangement of FIG. 1.

While it is contemplated that temperature switch 55 and sensor 56 may comprise any suitable system of temperature sensing and responsive devices, there is shown in FIG. 2 of the drawings a schematic diagram illustrating a particular form of sensing thermocouple and electronically controlled switching system as the best mode presently known by us for fulfilling these functions. In FIG. 2 the sensor 56 comprises a chromel-alumel thermocouple, the body of which is embedded in the casing of the catalytic converter unit 39 of FIG. 1 of the drawings. The thermocouple 56 is electrically connected with the switch 55 which consists of an amplifier circuit 62 connected with a comparator circuit 63 which compares the amplified signal with a reference voltage supplied by a reference voltage supply circuit 64.

A power transistor 66 acts as a switch controlled by the comparator circuit so that when the amplified signal from the thermocouple is lower than the reference voltage, indicating a temperature below the predetermined operating temperature of the catalytic converter, the power transistor permits the passage of current from the power source to the magnet valves 52, 54. On the other hand, when the amplified signal from the thermocouple exceeds the reference voltage, indicating a converter temperature above the predetermined light-off temperature, the power transistor is shut off, preventing the passage of current and deenergizing the magnet valves 52, 54. Thus, is should be apparent that adjustment of the reference voltage by varying the resistance in the circuit 64 permits selection of the catalytic converter operating temperature at which the changeover from the warm-up mode to the normal operating mode of the bypass valve control system takes place.

While the invention has been described by reference to a specific embodiment, it should be understood that numerous changes could be made in the various features described without departing from the spirit and scope of the inventive concepts disclosed. Accordingly, it is intended that the invention not be limited to the details of the disclosed embodiment, but that it have the full scope permitted by the language of the following claims.

The embodiments of the invention in which an exclusive property or privilege is claimed are defined as follows:

1. The combination in an automotive vehicle of a turbocharged internal combustion engine with at least one variable volume working and combustion chamber, intake and exhaust systems each connected with said combustion chamber for respectively conducting intake gases to and exhaust gases from the combustion chamber, a turbocharger having a compressor in the intake system driven by a turbine in the exhaust system that recovers power from the engine exhaust gases, and an exhaust treatment device that utilizes waste heat to encourage reaction of residual products in the exhaust gases, said treatment device being connected in the exhaust system downstream of the turbine, a bypass passage around the turbine and connecting the combustion chamber directly to the exhaust treatment device, a valve operable to open and close the bypass passage, and the improvement comprising actuating and control means normally operating said valve to close said bypass and operative in response to a selected engine operation related temperature and to intake system pressure into the combustion chamber to operate said valve to open said bypass at temperature levels below a predetermined level of said selected temperature occurring during initial engine warm-up and an intake system pressures into the combustion chamber in excess of a predetermined pressure whereby to provide fast warm-up of the exhaust treatment device after engine starting and to limit compressor outlet pressure to a predetermined level during engine operation.

2. The combination in an automotive vehicle of a turbocharged internal combustion engine having a plurality of variable volume working and combustion chambers, intake and exhaust systems each connected with said combustion chambers for respectively conducting intake gases to and exhaust gases from said chambers, a turbocharger having a compressor in the intake system driven by a turbine in the exhaust system that recovers power from the engine exhaust gases, and an exhaust treatment device that utilizes waste heat to encourage reaction of residual products in the exhaust gases, said treatment device being connected in the exhaust system downstream of the turbine, a bypass passage around the turbine and connecting the combustion chambers directly to the exhaust treatment device, a valve operable to open and close the bypass passage, and the improvement comprising, biasing means acting with a predetermined force to urge said valve toward its closed position, movable wall means connected with said valve and defining first and second pressure chambers arranged such that positive pressure in said first chamber urges said valve in a closing direction and positive pressure in said second chamber urges said valve in an opening direction, air pressure supply means operative to provide a reference pressure slightly below the desired maximum boost pressure in said intake manifold, control valve means operative in a first position to connect said second chamber with said reference pressure and said first chamber with said intake system between the compressor and combustion chambers whereby manifold vacuum in said first chamber acting with the reference pressure in said second chamber is sufficient to open said bypass valve during normal operation of the engine below the wide open throttle condition and bypass exhaust gases directly to the exhaust treatment device to speed its warm-up, said control valve means being operative in a second position to connect said second chamber with said induction system between said turbocharger compressor and said combustion chambers and to connect said first chamber with atmosphere whereby manifold pressure in excess of a predetermined value is operative to open said valve in amounts sufficient to maintain said manifold pressure below said predetermined value, means responsive to the operating temperature in a selected portion of the engine exhaust system to move said control valve means to said first position at temperatures below a predetermined temperature and to move said control valve means to said second position at temperatures above said predetermined temperature, whereby said bypass valve opens to aid warm-up of said exhaust treatment device when the selected exhaust temperature is below said predetermined temperature and the bypass valve operates as a turbocharger boost control wastegate when the selected exhaust temperature is above said predetermined temperature.

3. The combination of claim 2 wherein said exhaust treatment device is a catalytic converter and said temperature responsive means includes a sensor mounted to sense the operating temperature of a portion of said converter.

4. The combination of claim 2 wherein the force of said biasing means is sufficiently greater than the force of said reference pressure acting on said movable wall means in the first position of said control valve means that the reduction in manifold vacuum during engine operation near wide open throttle is sufficient to permit said biasing means to at least partially close said valve and thereby provide at least partial operation of the turbocharger to obtain nearly full engine power when needed in advance of full warm-up of the exhaust treatment device.

* * * * *